(12) United States Patent
Moon et al.

(10) Patent No.: US 8,493,583 B2
(45) Date of Patent: Jul. 23, 2013

(54) IMAGE FORMING APPARATUS AND METHOD FOR CONTROLLING THE SAME

(75) Inventors: Chong Ho Moon, Suwon-si (KR); In Sung Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 936 days.

(21) Appl. No.: 11/965,007

(22) Filed: Dec. 27, 2007

(65) Prior Publication Data
US 2008/0158586 A1 Jul. 3, 2008

(30) Foreign Application Priority Data

Dec. 28, 2006 (KR) .................. 10-2006-0136538

(51) Int. Cl.
*G06K 15/00* (2006.01)
*G06F 3/12* (2006.01)
*G06F 15/00* (2006.01)
*H04N 3/08* (2006.01)

(52) U.S. Cl.
USPC ....... 358/1.14; 358/1.15; 358/1.13; 358/1.17; 358/504; 706/45; 400/74

(58) Field of Classification Search
USPC ...... 358/1.15, 1.14, 1.18, 1.9; 706/45; 400/74
See application file for complete search history.

(56) References Cited

U.S. PATENT DOCUMENTS

| | | | | |
|---|---|---|---|---|
| 4,849,879 A | * | 7/1989 | Chinnaswamy et al. | 706/45 |
| 5,800,073 A | * | 9/1998 | Matsuda et al. | 400/74 |
| 5,845,057 A | * | 12/1998 | Takeda et al. | 358/1.15 |
| 6,254,085 B1 | * | 7/2001 | Kang | 271/171 |
| 6,501,929 B1 | * | 12/2002 | Warbus et al. | 399/130 |
| 6,567,175 B1 | * | 5/2003 | Lee | 358/1.14 |
| 6,618,566 B2 | * | 9/2003 | Kujirai et al. | 399/79 |
| 6,652,169 B2 | * | 11/2003 | Parry | 400/74 |
| 6,657,740 B1 | * | 12/2003 | Emminizer | 358/1.14 |
| 6,864,993 B1 | * | 3/2005 | Roberts et al. | 358/1.9 |
| 7,298,514 B2 | * | 11/2007 | Nishimura | 358/1.15 |

(Continued)

FOREIGN PATENT DOCUMENTS

| | | |
|---|---|---|
| JP | 2001-312377 | 11/2001 |
| JP | 2005-316858 | 11/2005 |

OTHER PUBLICATIONS

Korean Office Action for related Korean Patent Application No. 10-2006-0136538, mailed on Nov. 19, 2012.

*Primary Examiner* — Akwasi M Sarpong
(74) *Attorney, Agent, or Firm* — Staas & Halsey LLP

(57) ABSTRACT

An image forming apparatus and a method for controlling the same are disclosed. The image forming apparatus supports the printing management function, such that it can continue or cancel the printing operation when a printing-operation change factor occurs during the printing operation established by the user. In the case of using the printing management function, the user can easily stop the printing operation when the erroneous data occurs or he or she desires to cancel the remaining printing operations during the printing operation, such that an amount of resources required for the printing operation can be minimized, resulting in the implementation of increased operation efficiency. The method for controlling the image forming apparatus includes: determining whether the number of printed papers is equal to a predetermined printing-check paper number during a printing operation; and if the number of printed papers is equal to the predetermined printing-check paper number, comparing printing information for each page of printed data with the other printing information for each actually-applied page, and determining the presence or absence of a printing error.

20 Claims, 7 Drawing Sheets

U.S. PATENT DOCUMENTS

| | | | |
|---|---|---|---|
| 7,397,575 B2 * | 7/2008 | Sekiguchi | 358/1.15 |
| 7,525,682 B2 * | 4/2009 | Mori et al. | 358/1.18 |
| 2005/0073709 A1 * | 4/2005 | Kujirai et al. | 358/1.14 |
| 2010/0054467 A1 * | 3/2010 | Cho | 380/51 |

* cited by examiner

FIG. 2

| Layout | Paper | Graphic | Additional function | Information |

Number of papers (1-999) [250]　printing-information check period [250]

Paper setup
Paper size　[A4 ▼]
[User-defined paper]

FIG. 3

| # of pages |
|---|
| Tray |
| Resolution |
| Emulation |
| ... |

FIG. 4

| 100 |
|---|
| 1 |
| 600 |
| PCL6 |
| ... |

Table 1

| 50 |
|---|
| 1 |
| 1200 |
| PCL6 |
| ... |

Table 2

| 100 |
|---|
| 2 |
| 600 |
| PCL6 |
| ... |

Table 3

IMAGE FORMING APPARATUS AND METHOD FOR CONTROLLING THE SAME

CROSS-REFERENCE TO RELATED APPLICATION

This application claims the benefit of Korean Application No. 2006-136538, filed Dec. 28, 2006 in the Korean Intellectual Property Office, the disclosure of which is incorporated herein by reference.

BACKGROUND OF THE INVENTION

1. Field of the Invention

Aspects of the present invention relate to an image forming apparatus, and more particularly, to an image forming apparatus (e.g., a printer or a multi-function printer) that allows a user to manage a variety of printing operations (e.g., a printing error checkup function or a function to adjust a number of printing papers) during an image forming operation, and a method of controlling the same.

2. Description of the Related Art

In general, an image forming apparatus (e.g., a printer or multi-function printer) including a printing function receives data from a host (such as a computer), and prints the received data on a print medium (such as paper, transparencies, etc.). The image forming apparatus includes firmware acting as a control program to drive the image forming apparatus. Furthermore, a printer driver and an application program are installed in the computer. A user drives the image forming apparatus using the firmware, the printer driver, and the application program, such that the printing process is executed.

Conventionally, if a large amount of documents are printed, the image forming apparatus successively prints the large amount of documents without interruption in a printing operation. Therefore, if a printing error occurs in the printing operation, a user is unable to recognize the progress of the printing operation. Also, the user is unable to stop printing when he or she desires to stop the printing operation, such that unnecessary papers or toners are consumed, and unnecessary time and production costs are consumed due to a re-printing operation.

SUMMARY OF THE INVENTION

Aspects of the present invention provide an image forming apparatus to interrupt a printing action whenever a predetermined number of papers prescribed for the printing check function are printed while a large amount of documents are printed, to check the presence or absence of a printing error, to inform a user of a current printing action status, to allow the user to freely select the restarting of the printing action, thereby reducing the number of unnecessarily-consumed articles and providing greater convenience of use, and a method for controlling the same.

Additional aspects and/or advantages of the invention will be set forth in part in the description which follows and, in part, will be obvious from the description, or may be learned by practice of the invention.

According to an aspect of the present invention, there is provided a method of controlling an image forming apparatus, the method including: determining whether a number of printed pages of print media is equal to a predetermined printing information check period value during a print operation; if the number of printed pages is equal to the predetermined printing information check period value, comparing predetermined printing information of a printed page of the print medium with actual printing information of the printed page; and determining a presence of a printing error if the actual printing information does not correspond to the predetermined printing information.

The method may further include informing a user of the presence or an absence of the printing error.

The method may further include: after informing the user of the presence or absence of the printing error, continuing the print operation upon receiving a printing continue command from the user.

The continuing of the print operation may include: generating a message to query the user whether to continue the printing operation.

The continuing of the print operation may include: if the absence of the printing error is determined, generating a message to query the user whether to continue the printing operation.

According to another aspect of the present invention, there is provided a method of controlling an image forming apparatus, the method including: receiving a printing information check period value for checking printing information; storing printing information for each page of data to be printed; if a number of printed pages is equal to the predetermined printing information check period value, comparing the stored printing information of a printed page with actual printing information of the printed page; and determining a presence of a printing error if the actual printing information does not correspond to the predetermined printing information.

The method may further include: if the number of printed pages is equal to the predetermined printing information check period value, pausing a print operation of the data.

The method may further include: informing a user of the presence or an absence of the printing error.

The method may further include: after informing the user of the presence or absence of the printing error, continuing the printing operations upon receiving a printing continue command from the user.

The method may further include: if the absence of the printing error is determined, generating the message to query the user whether to restart the printing operation.

According to yet another aspect of the present invention, there is provided an image forming apparatus including: a setup unit to receive a printing information check period value for checking printing information; a storage unit to store printing information for each page of data to be printed; and a decision unit to determine whether the stored printing information of a printed page is equal to actual printing information of the printed page when a number of printed papers is equal to the stored printing information check period value, and to determine a presence of a printing error if the actual printing information is not equal to the stored printing information.

The apparatus may further include: a controller for controlling an operation capable of informing a user of the presence or an absence of the printing error.

The controller may continue the printing operation upon receiving a printing continue command from the user.

The controller may, if the absence of the printing error is determined, generate a message to query the user whether to continue the printing operation.

The controller may, if the number of printed pages is equal to the predetermined printing information check period value, pause the printing operation of the data.

According to another aspect of the present invention, there is provided a host apparatus to transmit print data to an image forming apparatus that prints the print data in a print operation, the host apparatus including: a setup unit to receive a printing information check period value for checking printing information during the print operation; a storage unit to store printing information for each page of the print data; and a decision unit to determine whether the stored printing information of a printed page corresponds to actual printing information of the printed page when a number of printed pages during the print operation is equal to the predetermined printing information check period value, and to determine a presence of a printing error if the actual printing information does not correspond to the stored printing information.

According to another aspect of the present invention, there is provided an image forming system including: a host apparatus to generate print data and to transmit the print data to be printed in a print operation; and an image forming apparatus to receive the print data and to print the print data in the print operation, the image forming apparatus including: a determining unit to determine whether a number of printed pages during the print operation is equal to a predetermined printing information check period value; and a decision unit to compare, during the print operation, predetermined printing information of a printed page to actual printing information of the printed page when the number of printed pages is equal to the predetermined printing information check period value, and to determine a presence of a printing error if the actual printing information does not correspond to the stored printing information.

According to still another aspect of the present invention, there is provided an image forming system including: an image forming apparatus to receive print data and to print the print data in a print operation; and a host apparatus to generate the print data and to transmit the print data to the image forming apparatus, the host apparatus including: a determining unit to determine whether a number of printed pages during the print operation is equal to a predetermined printing information check period value; and a decision unit to compare, during the print operation, predetermined printing information of a printed page to actual printing information of the printed page when the number of printed pages is equal to the predetermined printing information check period value, and to determine a presence of a printing error if the actual printing information does not correspond to the stored printing information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 shows a screen image for receiving a printing-information check period of FIG. 1 according to an embodiment of the present invention;

FIG. 3 shows page information recorded in a page-information table stored in the storage unit of FIG. 1 according to an embodiment of the present invention;

FIG. 4 shows a page-information table for recording different printing information of individual pages of FIG. 3 according to an embodiment of the present invention;

DETAILED DESCRIPTION OF THE EMBODIMENTS

Figure 1:
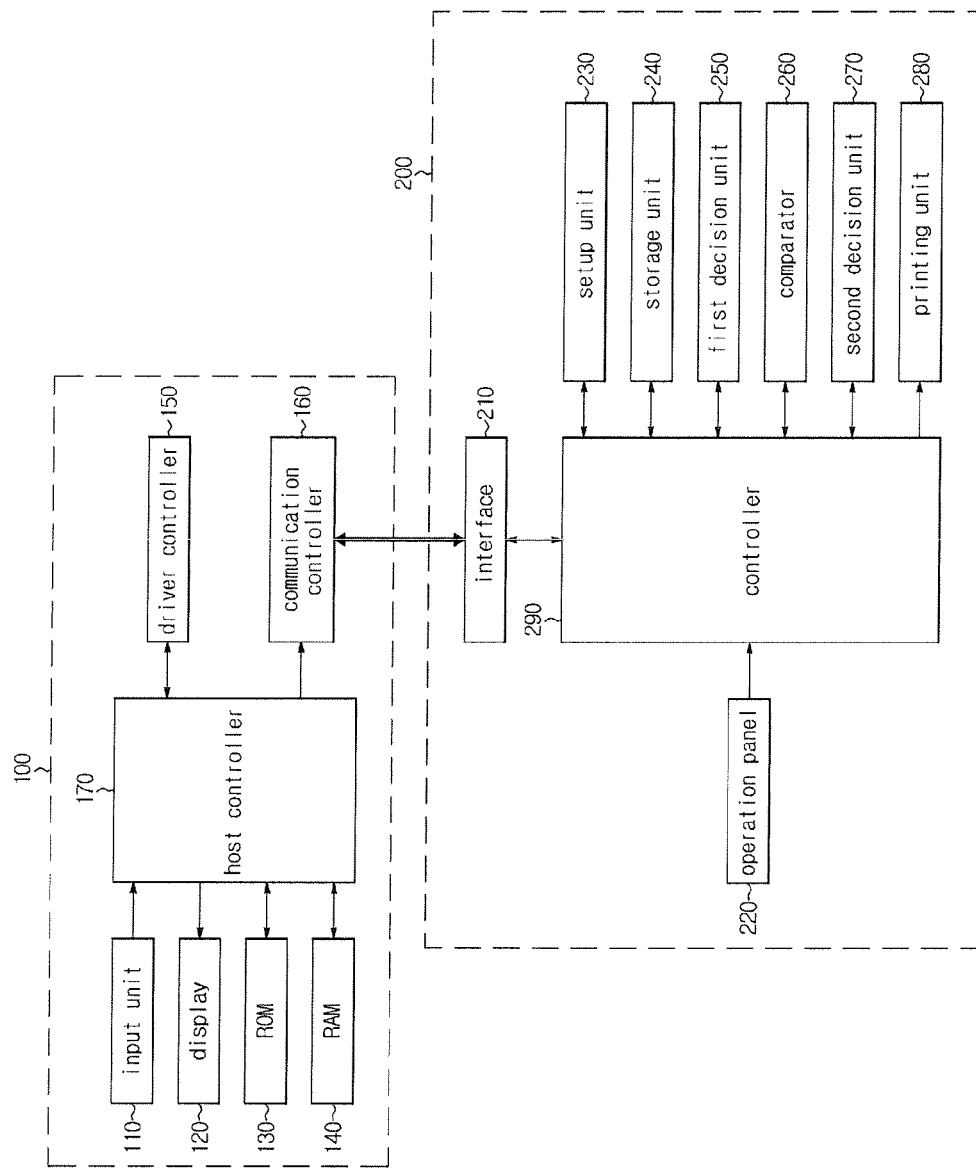
FIG. 1 is a block diagram illustrating an image forming system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an image forming system according to an embodiment of the present invention. Referring to FIG. 1, the image forming system includes a host computer 100 and an image forming apparatus 200.

The host computer 100 implements a printer driver, and transmits a printing command and print data to the image forming apparatus 200 to print a desired image. The image forming apparatus 200 prints the print data upon receiving the printing command from the host computer 100.

The host computer 100 includes an input unit 110, a display 120, a Read Only Memory (ROM) 130, a Random Access Memory (RAM) 140, a driver controller 150, a communication controller 160, and a host controller 170.

The input unit 110 is a user interface through which a user can set a variety of functions supported by the host computer 100. For example, the input unit 110 may include a keyboard, a mouse, etc. such that the user enters a variety of commands to the host computer 100 using the keyboard or mouse. The commands are transmitted to the host controller 170 via a system bus.

The display 120 may also be used as a user interface. Specifically, the user can recognize a variety of program information implemented by the host computer 100 by referring to character and graphic data displayed on the display 120. The display 120 may be a Cathode Ray Tube (CRT), a Liquid Crystal Display (LCD), etc. Furthermore, the user can recognize, for example, a program implementation status or result by referring to a user interface (UI) window displayed on the display 120.

The ROM 130 is a nonvolatile memory that maintains data even when the host computer 100 is powered off. The ROM 130 includes a control program (such as an Operating System) required to implement a variety of functions of the host computer 100, a variety of application programs, etc. The RAM 140 is a volatile memory that stores a variety of data generated while corresponding programs are executed. The driver controller 150 implements a printer-driver function to control operations of the image forming apparatus 200. The communication controller 160 transmits print data generated from the host computer 100 to the image forming apparatus 200.

The host controller 170 reads the control program stored in the ROM 130, and controls operations of the host computer 100. In particular, the host controller 170 performs a variety of functions using an application program desired by the user, and stores the print data generated by the application program in the RAM 140. The host controller 170 controls the driver controller 150 in order to control operations of the image forming apparatus 200.

The image forming apparatus 200 includes an interface unit 210, an operation panel 220, a setup unit 230, a storage unit 240, a first decision unit 250, a comparator 260, a second decision unit 270, a printing unit 280, and a controller 290.

The interface unit 210 is detachably connected to the host computer 100, and supports a communication interface with the host computer 100. The interface unit 210 may be connected to the host computer through a wired connection (such as with a printer cable or network cable) or a wireless connection (such as Bluetooth or infrared).

The operation panel 220 transmits a user command to the controller 290 and displays status information of the image forming apparatus 200 upon receiving a control signal from the controller 290. Furthermore, the operation panel includes an operation unit and a display (such as an LCD display) to display the status information.

The setup unit 230 sets a check period of the printing information (such as a number of pages of print media to be used for the printing check function). For example, if the user clicks on "Paper" from among printing options on a printing screen image of the host computer 100, a specific screen image on which the user can enter a printing information check period is displayed as shown in FIG. 2. If the user enters the printing information check period value (e.g., 50 papers) on the image of FIG. 2, the printing information check period is set to a specific time corresponding to the 50 papers. For reference, the user can adjust the number of total pages to be printed within a predetermined range from 1 page to 999 pages. However, it is understood that aspects of the present invention are not limited thereto, and the predetermined range may exceed 999 pages. Furthermore, it is understood that according to other aspects, the user can also enter the number of pages of print media using the image forming apparatus 100.

Figure 3:
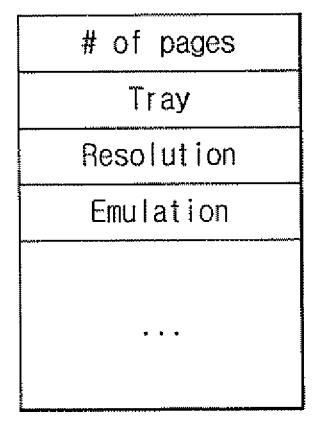

The storage unit 240 stores printing information for each page of the print data to be printed. As shown in FIG. 3, the printing information for each page is stored in the form of a page-information table. This page information table is divided into several layers (or rows). The highest layer from among the several layers stores the number of total pages (i.e., # of pages), and tray information, resolution information, and emulation information are sequentially stored in the next layers located under the highest layer. However, it is understood that aspects of the present invention are not limited thereto, and the order of layers may be different and/or other information may be stored in the page information table. The same printing information may be assigned to the total pages to be printed. Alternatively, it is understood that different printing information may be assigned to individual page groups (for example, 1-100, 101-150, and 151-250). In this case, data is stored in the form of page tables 1-3, each of which is divided into several layers according to the printing information, as shown in FIG. 4. It is understood that the printing information may include more or less categories of information, and may include any combination of the number of total pages, the tray information, the resolution information, and the emulation information (for example, the printing information may include only the tray information and the resolution information or may include only the resolution information).

The first decision unit 250 counts a number of actually-printed print media, and determines whether the counted number corresponds to a printing information check period value (for example, a number of printed print media) established by the setup unit 230. If it is determined that the counted number corresponds to the printing information check period value, the first decision unit 250 determines a current time to be a printing information check period. Otherwise, if the counted number does not correspond to the printing information check period value, the first decision unit 250 determines that a current time is not the printing information check period. It is understood that the check period need not be a number of pages of print media in all aspects of the present invention. For example, the check period may be set in increments of seconds and/or minutes.

The comparator 260 compares actual printing information of the printing operation with the printing information stored in the storage unit 240, and determines whether the actual printing information corresponds to the stored printing information. The comparator 260 performs the printing operation until the number of printed print media equals the printing information check period value, and then momentarily stops (i.e., pauses) the printing operation. For example, the comparator 260 determines whether the actual printing information of the last print medium printed prior to the momentary stoppage of the printing operation is equal to the last printing page information contained in the printing information stored in the storage unit 240.

The second decision unit 270 determines whether a current printing operation corresponds to a printing error upon receiving a comparison result from the comparator 260. That is, if the actual printing information is not equal to the printing information stored in the storage unit 240 (according to the comparison result of the comparator 260), the second decision unit 270 determines the presence of the printing error. Otherwise, if the actual printing information is equal to the printing information stored in the storage unit 240, the second decision unit 270 determines the absence of the printing error.

The printing unit 280 prints the print data on a print medium according to a control signal of the controller 290. The controller 290 controls overall printing management control operations.

Figure 5:
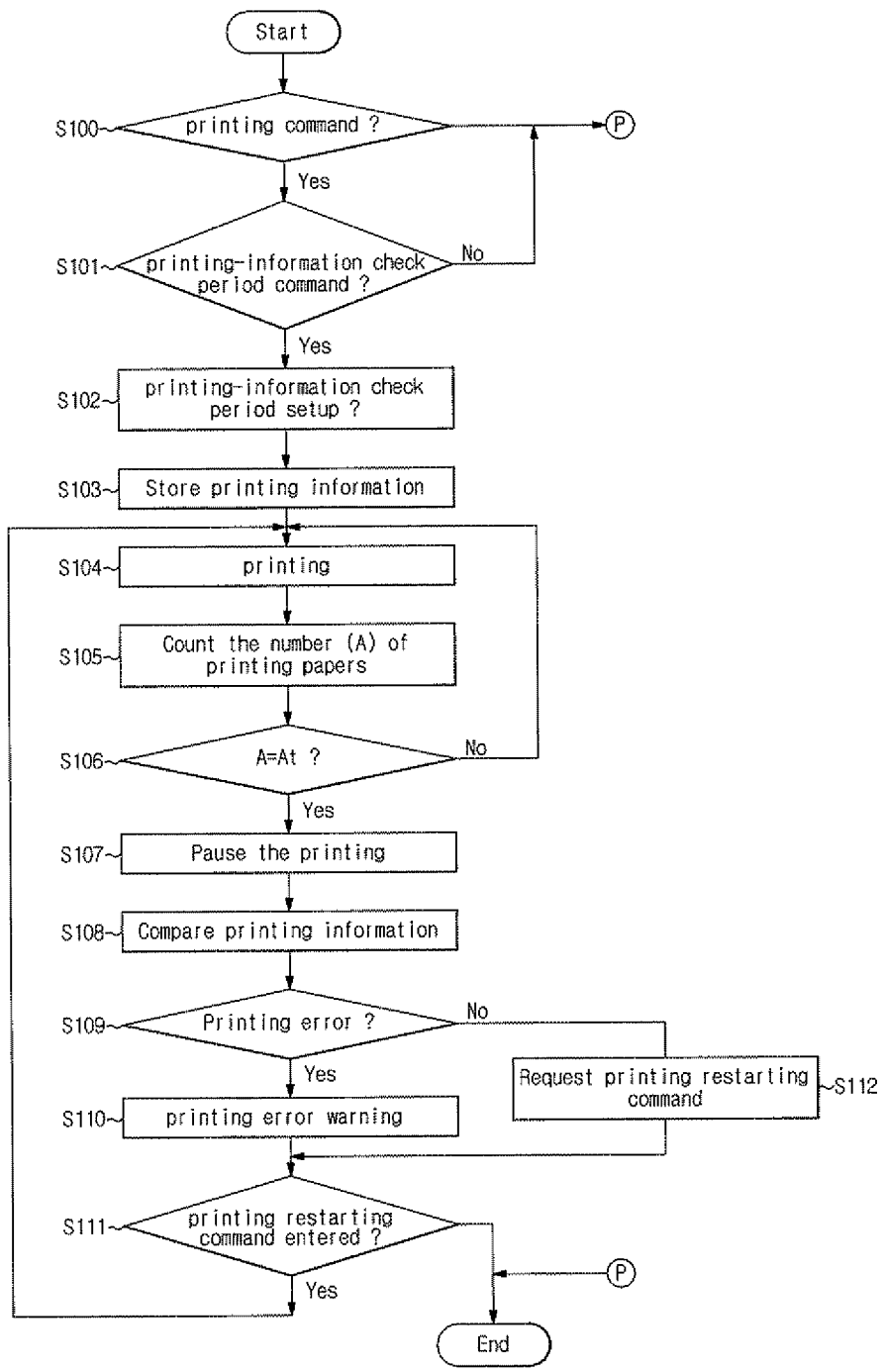
FIG. 5 is a flow chart illustrating a printing management method for use in an image forming apparatus according to an embodiment of the present invention.

Operations of the controller 290 will now be described with reference to FIG. 5. FIG. 5 is a flow chart illustrating a printing management method for use in the image forming apparatus 200 according to an embodiment of the present invention. Referring to FIG. 5, the controller 290 determines the presence or absence of a printing command in operation S100, and determines the presence or absence of a printing information check period command in operation S101.

If the printing command and the printing information check period command are entered (operations S100 and S101, respectively), the controller 290 establishes a printing information check period via the setup unit 230 according to the printing information check period value entered by a user in operation S102. Furthermore, the controller 290 stores printing information for each page of the print data to be printed in the storage unit 240 in operation S103. Thereafter, the controller 290 prints the print data via the printing unit 280 in operation S104.

During the printing operation of the print data, the controller 290 counts a number of printed pages using the first decision unit 250, and determines whether the number (A) of printed pages corresponds to the printing information check period value (At) in operation S106. If the number (A) of printed pages is not equal to the predetermined number (At) of pages (operation S106), the controller 290 determines that a current time is not the printing information check period, and returns to the above-mentioned operation S104.

In the meantime, if the number (A) of printed pages is equal to the printing information check period value (At) (operation S106), the controller 290 determines that the current time is the printing information check period, and the controller 290 stops the printing operation in operation S107. Then, the comparator 260 determines whether actual printing information of the printed pages is equal to the stored printing information (operation S103) in operation S108. In other words, the controller determines whether the printing information of the last page of print medium printed prior to the momentary stoppage of the printing operation is equal to the printing information of the same page stored in the storage unit 240.

The controller 290 then determines the presence or absence of a printing error using the second decision unit 270 according to the comparison result (operation S108) in operation S109. If the actual printing information is not equal to the stored printing information, the controller determines the presence of the printing error. Otherwise, if the actual printing information is equal to the printing information, the controller determines the absence of the printing error.

If the presence of the printing error is determined (operation S109), the controller 290 outputs a warning message indicating the printing error in operation S110. For example, the warning message may be a printing-error warning screen image, may be output to the host computer 100, and/or may be generated via the operation panel 220.

Thereafter, the controller 290 determines whether a printing restart command is entered by the user in operation S111. If it is determined that the printing restart command is entered by the user in operation S111, the controller 290 returns to operation S104 in order to restart the printing operation. In contrast, if the printing restart command is not entered by the user, the controller 290 stops control operations.

In the meantime, if the presence of the printing error is not determined (operation S109), the controller 290 requests the user to enter the printing restart command in operation S112. If it is determined that the printing restart command has been entered by the user (operation S111), the controller 290 returns to operation S104.

The above-mentioned control operations are repeatedly applied to the remaining pages to be printed until the printing operation is completed.

Although the above-mentioned embodiments have disclosed that the printing management control operations are performed by the image forming apparatus 200, aspects of the present invention are not limited thereto. For example, the above-mentioned printing management control operations can be performed by another external device or by the host computer 100 including a printer driver.

Figure 6:
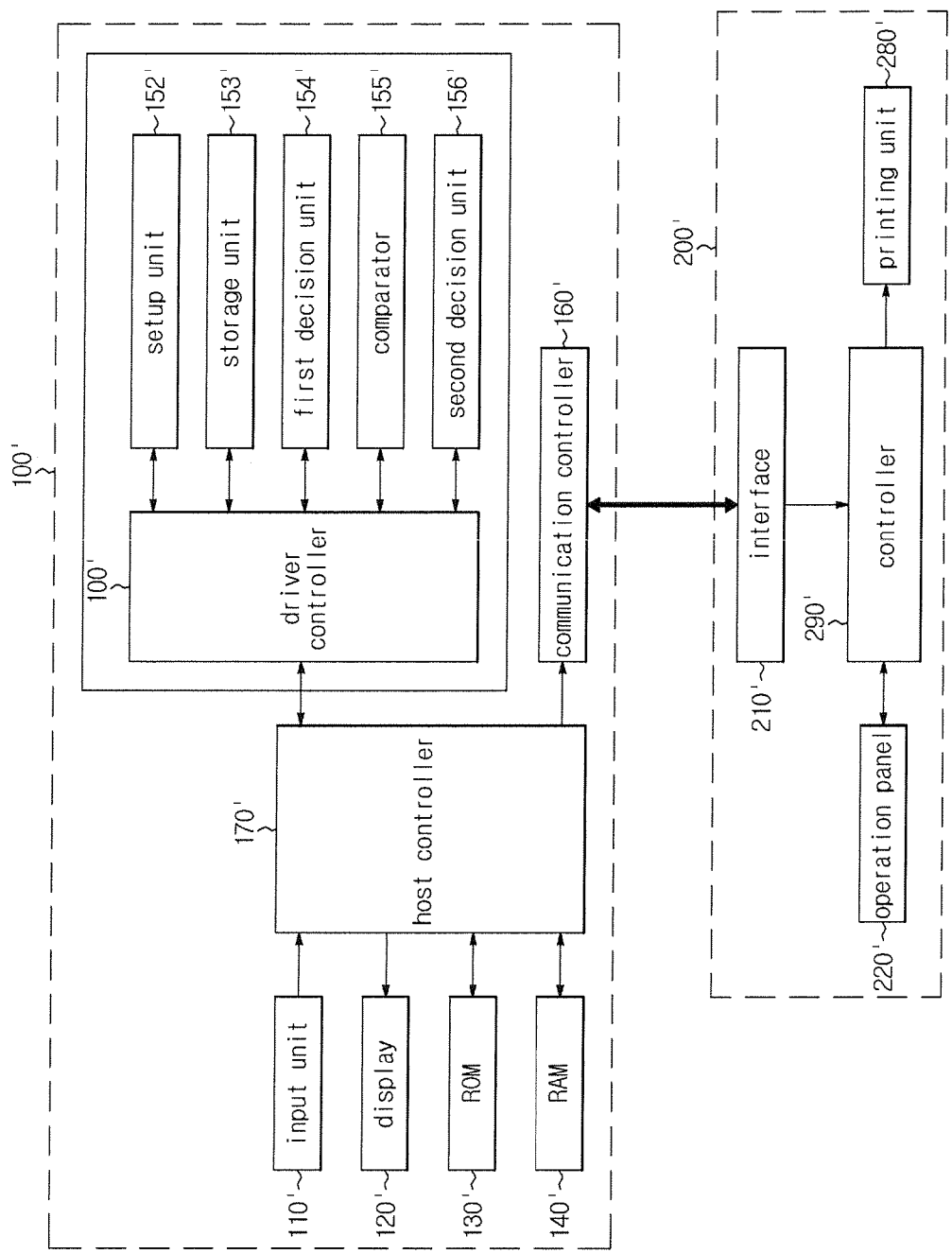
FIG. 6 is a block diagram illustrating an image forming system according to another embodiment of the present invention.
Figure 7:
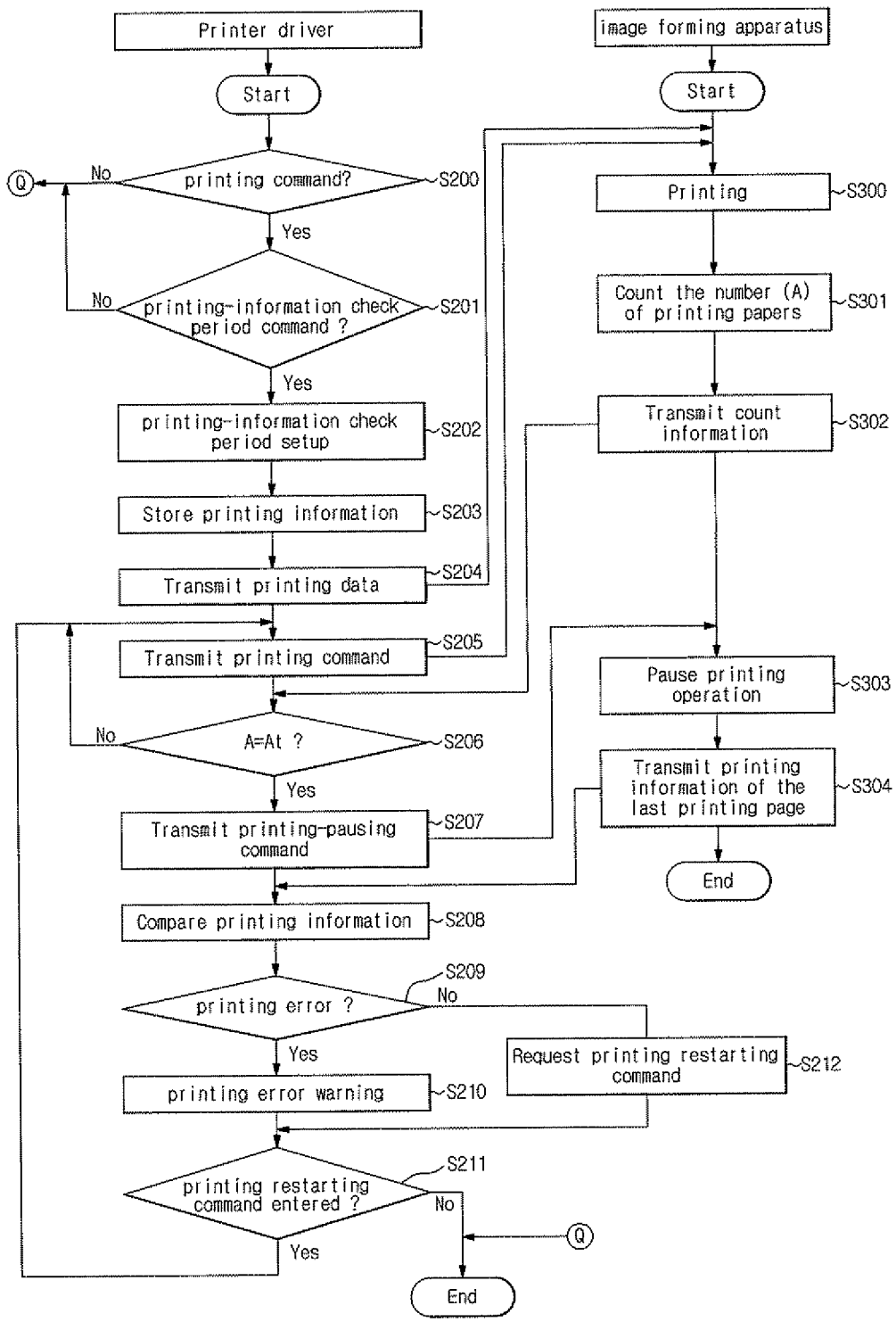
FIG. 7 is a flow chart illustrating a printing management method for use in an image forming apparatus according to another embodiment of the present invention.

FIG. 6 is a block diagram illustrating an image forming system according to another embodiment of the present invention. FIG. 7 is a flow chart illustrating a printing management method for use in an image forming apparatus according to another embodiment of the present invention. Referring to FIGS. 6 and 7, the printer driver 150' includes a driver controller 151', a setup unit 152', a storage unit 153', a first decision unit 154', a comparator 155', and a second decision unit 156'.

The driver controller 151' performs overall printing management control operations. However, the driver controller 151' cannot recognize a number of actually-printed pages of print media and printing information of the last printed page when a specific print medium corresponding to a printing information check period value is printed. Accordingly, the printer driver receives the counting information in operation S302 (FIG. 7) and receives the printing information of the last printed page in operation S304. The printing management control operations of the above-mentioned driver controller 151' are the same as those of the controller 290 of FIG. 5, and a detailed description thereof will herein be omitted for the convenience of description.

If a large amount of documents are printed by an unstable image forming system, unexpected data errors may occur during the printing operation. In this case, the above-mentioned printing management control operations can be made available. For example, in the case of printing a 500 page document, if the user desires to check whether the printing operation is free of errors at intervals of a predetermined period corresponding to 150 papers, the printing information check period value is set to "150." Accordingly, the image forming system compares a page information table to actual printing information at a time point of 150 printed pages, a time point of 300 printed pages, and a time point of 450 printed pages. If the page information table is different from the actual printing information, the image forming system outputs a message to invite the user to check the printed result and/or to inform the user of an error. The user can continue or cancel the printing operation after recognizing the message. If the printing operation is cancelled, the user deletes the remaining print data to stop the printing operation.

If, for example, the above-mentioned printing management control operations are applied to a specific case in which the printed pages are distributed to attendants of a conference room, the amount of unnecessarily-consumed articles can be minimized. For example, provided that the maximum number of attendants of the conference room is 20 and 10 pages of print media must be assigned to each attendant, 200 pages must be printed. If the printing information check period is set to a specific time corresponding to 10 pages, a check message is displayed whenever 10 pages of print media are printed. When the attendant enters the conference room, the printed pages are assigned to the attendant. Indeed, if the number of actual attendants is set to 15, the printing operation is cancelled when the 15th check message is displayed, such that the printing of the remaining 50 pages (corresponding to 5 groups) may be omitted.

As is apparent from the above description, the image forming apparatus according to aspects of the present invention supports a printing management function such that the image forming apparatus can continue or cancel a printing operation when a printing operation change factor occurs during the printing operation established by the user. In the case of using the above-mentioned printing management function, the user can easily stop the printing operation when the erroneous data occurs or he or she desires to cancel the remainder of the printing operation. As a result, an amount of resources required for the printing operation can be minimized, resulting in the implementation of increased operation efficiency.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling an image forming apparatus during a print operation, the method comprising:
inputting predetermined printing information check period value, wherein a user inputs the predetermined printing information check period value through a user interface;
determining whether a number of printed pages of print media is equal to a predetermined printing information check period value during the print operation;
if the number of printed pages is equal to the predetermined printing information check period value, comparing predetermined printing information of a printed page of the print medium with actual printing information of the printed page; and
determining a presence of a printing error if the actual printing information does not correspond to the predetermined printing information using a controller, wherein the predetermined printing information includes:
first predetermined printing information corresponding to a first number range of printed pages, and second predetermined printing information, different from the first predetermined printing information, corresponding to a second number range of printed pages;
categories of information including a total number of pages to be printed information, a tray information, a resolution information, and an emulation information;
and the comparing of the predetermined printing information with the actual printing information comprises:
comparing the first predetermined printing information to the actual printing information if the number of printed pages corresponds to the first number range, and comparing the second predetermined printing information to the actual printing information if the number of printed pages corresponds to the second number range.

2. The method as claimed in claim 1, further comprising:
informing the user of the presence of the printing error if the actual printing information does not correspond to the predetermined printing information.

3. The method as claimed in claim 2, further comprising:
pausing the print operation if the presence of the printing error is determined; and
continuing the print operation if the user inputs a command to continue the print operation.

4. The method as claimed in claim 3, wherein the continuing of the print operation comprises:
outputting a message to query the user whether to continue the print operation.

5. The method as claimed in claim 1, further comprising:
pausing the print operation if the number of printed pages is equal to the predetermined printing information check period value.

6. The method as claimed in claim 1, wherein the comparing of the predetermined printing information with the actual printing information comprises:
comparing the predetermined printing information with actual printing information of a page that is printed last when the number of printed pages of the print media is determined to be equal to the predetermined printing information check period value.

7. A method of controlling an image forming apparatus during a print operation, the method comprising:
receiving a printing information check period value for checking printing information from a user through a user interface;
storing printing information for each page of data to be printed; if a number of printed pages of print media is equal to the predetermined printing information check period value, comparing the stored printing information of a printed page with actual printing information of the printed page; and determining a presence of a printing error if the actual printing information does not correspond to the stored printing information, wherein the storing of the printing information for each page of data to be printed comprises: storing first printing information corresponding to a first number range of printed pages;
and storing second printing information, different from the first printing information, corresponding to a second number range of printed pages, and
wherein the user inputs the first number range and the second number range;
wherein the comparing of the stored printing information with the actual printing information comprises:
comparing the first printing information to the actual printing information if the number of printed pages corresponds to the first number range, and
comparing the second printing information to the actual printing information if the number of printed pages corresponds to the second number range.

8. The method as claimed in claim 7, further comprising:
pausing the print operation if the number of printed pages is equal to the predetermined printing information check period value.

9. The method as claimed in claim 8, further comprising:
informing the user of the presence or an absence of the printing error.

10. The method as claimed in claim 9, further comprising:
continuing the print operation if the user inputs a command to continue the print operation.

11. An image forming apparatus comprising: a user interface to receive a printing information check period value from a user;
a setup unit to receive from the user interface the printing information check period value for checking printing information during a print operation;
a storage unit to store printing information for each page of data to be printed in the print operation; and
a decision unit to determine whether the stored printing information of a printed page corresponds to actual printing information of the printed page when a number of printed pages during the print operation is equal to the predetermined printing information check period value, and to determine a presence of a printing error if the actual printing information does not correspond to the stored printing information, wherein the storage unit stores first printing information corresponding to a first number range of printed pages, and stores second printing information corresponding to a second number range of printed pages, different from the first number range, and wherein the user inputs the first number range and the second number range;
the decision unit determines whether the first printing information corresponds to the actual printing information of the printed page when the number of printed pages corresponds to the first number range; and
the decision unit determines whether the second printing information corresponds to the actual printing information of the printed page when the number of printed pages corresponds to the second number range.

12. The apparatus as claimed in claim 11, further comprising:
a controller to control an output of a message informing the user of the presence or an absence of the printing error.

13. The apparatus as claimed in claim 11, further comprising:

a controller to pause the print operation if the number of printed pages is equal to the predetermined printing information check period value.

14. The apparatus as claimed in claim 13, wherein the controller continues the print operation if a user inputs a command to continue the print operation.

15. The apparatus as claimed in claim 14, wherein the controller generates a message to query the user whether to continue the print operation.

16. The apparatus as claimed in claim 12, wherein the controller pauses the print operation of the data if the number of printed pages is equal to the predetermined printing information check period value.

17. An image forming system comprising:

a host apparatus to generate print data and to transmit the print data to be printed in a print operation; and an image forming apparatus to receive the print data and to print the print data in the print operation, the image forming apparatus comprising:

a user interface to receive a predetermined printing information check period value from a user;

a determining unit to determine whether a number of printed pages during the print operation is equal to the predetermined printing information check period value;

and a decision unit to compare, during the print operation, predetermined printing information of a printed page to actual printing information of the printed page when the number of printed pages is equal to the predetermined printing information check period value, and to determine a presence of a printing error if the actual printing information does not correspond to the stored printing information, wherein the predetermined printing information includes categories of information including a total number of pages to be printed information, a tray information, a resolution information, and an emulation information;

the decision unit determines whether the first printing information corresponds to the actual printing information of the printed page when the number of printed pages corresponds to the first number range; and the decision unit determines whether the second printing information corresponds to the actual printing information of the printed page when the number of printed pages corresponds to the second number range.

18. The image forming system as claimed in claim 17, wherein the image forming apparatus further comprises a storage unit to store the predetermined printing information for each page of the print data.

19. The image forming system as claimed in claim 17, wherein the image forming apparatus further comprises a controller to control the image forming apparatus to pause the print operation if the number of printed pages is equal to the predetermined printing information check period value.

20. The image forming system as claimed in claim 17, further comprising:

a controller to control an output of a message informing the user of the presence or an absence of the printing error.

* * * * *